United States Patent
Shimizu et al.

(10) Patent No.: US 9,950,461 B2
(45) Date of Patent: Apr. 24, 2018

(54) PRODUCTION METHOD FOR PHASE SHIFT FILM AND CIRCULAR POLARIZING PLATE INVOLVING BILATERALLY SYMMETRIC LOOPS WITH NON-SIMULTANEOUS REDUCTION OF CLIP PITCH

(71) Applicant: NITTO DENKO CORPORATION, Ibaraki-shi, Osaka (JP)

(72) Inventors: Takashi Shimizu, Ibaraki (JP); Satoshi Hirata, Ibaraki (JP); Seiji Kondo, Ibaraki (JP); Nao Murakami, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/892,808

(22) PCT Filed: Mar. 12, 2014

(86) PCT No.: PCT/JP2014/056433
§ 371 (c)(1),
(2) Date: Nov. 20, 2015

(87) PCT Pub. No.: WO2014/199689
PCT Pub. Date: Dec. 18, 2014

(65) Prior Publication Data
US 2016/0096312 A1 Apr. 7, 2016

(30) Foreign Application Priority Data
Jun. 10, 2013 (JP) .................................. 2013-121537

(51) Int. Cl.
*B29C 55/04* (2006.01)
*G02B 5/30* (2006.01)
(Continued)

(52) U.S. Cl.
CPC ............ *B29C 55/045* (2013.01); *B29C 55/04* (2013.01); *B29C 55/165* (2013.01);
(Continued)

(58) Field of Classification Search
None
See application file for complete search history.

(56) References Cited

U.S. PATENT DOCUMENTS

| 4,330,499 A | 5/1982 | von und zu Aufsess et al. |
| 7,803,900 B2 | 9/2010 | Nakai |

(Continued)

FOREIGN PATENT DOCUMENTS

| CN | 1543396 A | 11/2004 |
| CN | 101006370 A | 7/2007 |

(Continued)

OTHER PUBLICATIONS

Office Action dated Jan. 13, 2016, issued in counterpart Japanese Patent Application No. 2015-058554, with English translation. (11 pages).

(Continued)

*Primary Examiner* — Stephone B Allen
*Assistant Examiner* — Ryan S Dunning
(74) *Attorney, Agent, or Firm* — Westerman, Hattori, Daniels & Adrian, LLP

(57) ABSTRACT

Provided is a method capable of producing a retardation film suppressed in biaxiality, having a small Nz coefficient, and having a slow axis in an oblique direction with high production efficiency. The production method for a retardation film of the present invention includes: holding left and right side edge portions of a film to be stretched with left and right variable pitch-type clips configured to have clip pitches changing in a longitudinal direction, respectively; preheating the film; reducing, under a state in which a position at (Continued)

which the clip pitch of the clips on one side out of the left and right clips starts to reduce and a position at which the clip pitch of the clips on another side starts to reduce are set to different positions in the longitudinal direction, the clip pitch of each of the clips to a predetermined pitch to subject the film to oblique stretching; and releasing the clips holding the film.

4 Claims, 6 Drawing Sheets

(51) Int. Cl.
  *B29D 11/00* (2006.01)
  *B29C 55/16* (2006.01)
  *G02B 1/04* (2006.01)
  *B29K 29/00* (2006.01)
  *B29K 69/00* (2006.01)
  *B29K 105/00* (2006.01)
(52) U.S. Cl.
  CPC ...... *B29D 11/00644* (2013.01); *G02B 5/3083* (2013.01); *B29C 55/16* (2013.01); *B29K 2029/14* (2013.01); *B29K 2069/00* (2013.01); *B29K 2105/256* (2013.01); *B29K 2995/0034* (2013.01); *G02B 1/04* (2013.01); *G02B 5/3041* (2013.01)

(56) References Cited

U.S. PATENT DOCUMENTS

| | | | |
|---|---|---|---|
| 7,807,239 | B2 | 10/2010 | Konishi et al. |
| 8,028,383 | B2 | 10/2011 | Sano et al. |
| 8,535,588 | B2 | 9/2013 | Sano et al. |
| 8,778,486 | B2 | 7/2014 | Tanaka et al. |
| 8,952,600 | B2 | 2/2015 | Ren et al. |
| 2005/0019514 | A1 | 1/2005 | Takegawa et al. |
| 2007/0243367 | A1 | 10/2007 | Nagatake et al. |
| 2009/0036667 | A1 | 2/2009 | Hashimoto et al. |
| 2009/0116109 | A1 | 5/2009 | Konishi et al. |
| 2009/0128747 | A1 | 5/2009 | Sugiyama et al. |
| 2009/0261503 | A1 | 10/2009 | Sano et al. |
| 2009/0268292 | A1 | 10/2009 | Nakai |
| 2010/0221377 | A1 | 9/2010 | Sano et al. |
| 2012/0308796 | A1 | 12/2012 | Tanaka et al. |
| 2013/0163080 | A1 | 6/2013 | Araki et al. |
| 2013/0231455 | A1* | 9/2013 | Yasutomo ............ B29C 55/045 528/370 |
| 2013/0249378 | A1 | 9/2013 | Murakami et al. |
| 2013/0271833 | A1 | 10/2013 | Hatano |
| 2014/0225499 | A1 | 8/2014 | Ren et al. |
| 2014/0268333 | A1 | 9/2014 | Tanaka et al. |
| 2014/0268334 | A1 | 9/2014 | Tanaka et al. |
| 2014/0285888 | A1 | 9/2014 | Tanaka et al. |
| 2015/0247963 | A1 | 9/2015 | Fujisawa et al. |
| 2016/0052215 | A1 | 2/2016 | Shimizu et al. |
| 2016/0052216 | A1 | 2/2016 | Shimizu et al. |
| 2016/0096312 | A1 | 4/2016 | Shimizu et al. |

FOREIGN PATENT DOCUMENTS

| | | |
|---|---|---|
| CN | 101489760 A | 7/2009 |
| CN | 103052489 A | 4/2013 |
| EP | 2 502 947 A1 | 9/2012 |
| EP | 2570252 A2 | 3/2013 |
| EP | 2 570 252 A3 | 7/2013 |
| EP | 2 570 252 B1 | 7/2014 |
| JP | 2005-035131 A | 2/2005 |
| JP | 2005-319660 A | 11/2005 |
| JP | 2005-321543 A | 11/2005 |
| JP | 2006-348114 A | 12/2006 |
| JP | 2007-90753 A | 4/2007 |
| JP | 2007-094007 A | 4/2007 |
| JP | 2007-161994 A | 6/2007 |
| JP | 2007-261189 A | 10/2007 |
| JP | 2008-023775 A | 2/2008 |
| JP | 2008-162123 A | 7/2008 |
| JP | 2011-34069 A | 2/2011 |
| JP | 2011-235610 A | 11/2011 |
| JP | 4845619 B2 | 12/2011 |
| JP | 2012-31332 A | 2/2012 |
| JP | 2012-67300 A | 4/2012 |
| JP | 2012-163931 A | 8/2012 |
| JP | 2012-181536 A | 9/2012 |
| JP | 2012-226996 A | 11/2012 |
| JP | 2013-54338 A | 3/2013 |
| JP | 2013-75512 A | 4/2013 |
| JP | 2013-83907 A | 5/2013 |
| JP | 2013-120208 A | 6/2013 |
| JP | 2013-186399 A | 9/2013 |
| JP | 5333699 B1 | 11/2013 |
| KR | 10-2009-0030314 A | 3/2009 |
| TW | 200925672 A | 6/2006 |
| TW | 201234059 A1 | 8/2012 |
| WO | 03/056368 A1 | 7/2003 |
| WO | 2012/014595 A1 | 2/2012 |
| WO | 2012/017639 A1 | 2/2012 |
| WO | 2012/032984 A1 | 3/2012 |
| WO | WO 2012070451 A1 * | 5/2012 ........... B29C 55/045 |
| WO | 2012/077663 A1 | 6/2012 |
| WO | 2012/091009 A1 | 7/2012 |
| WO | 2013/038807 A1 | 3/2013 |
| WO | 2013/039178 A1 | 3/2013 |
| WO | 2013/125211 A1 | 8/2013 |

OTHER PUBLICATIONS

Japanese Office Action dated Jan. 21, 2015 issued in counterpart Japanese patent application No. 2013-121537, with English translation. (9 pages).
Taiwanese Office Action dated Aug. 26, 2015 issued in counterpart Taiwanese patent application No. 103111892, with English translation. (9 pages).
Japanese Office Action dated Oct. 22, 2014, issued in counterpart Japanese patent application No. 2013-121537, with English translation. (9 pages).
Office Action dated Oct. 22, 2014, issued in Japanese Application No. 2013-070788, with English translation. (12 pages).
Office Action dated Jan. 21, 2015, issued in Japanese Application No. 2013-070788, with English translation. (8 pages).
Office Action dated Jan. 27, 2016, issued in Japanese Patent Application No. 2015-058491, with English translation. (9 pages).
Extended (supplementary) European Search Report dated Oct. 5, 2016, issued in European Application No. 14773926.2. (9 pages).
International Search Report dated Jun. 3, 2014, issued in International Application No. PCT/JP2014/056403, with English translation. (4 pages).
Office Action dated Nov. 29, 2016, issued in Korean Patent Application No. 10-2015-7026546, with English translation. (12 pages).
Office Action dated Oct. 27, 2016, issued in Chinese Application No. 201480018492.5, with English translation. (18 pages).
Non-Final Office Action dated Feb. 14, 2017, issued in U.S. Appl. No. 14/780,695 (28 pages).
Non-Final Office Action dated Feb. 22, 2017, issued in U.S. Appl. No. 14/780,673 (31 pages).
Japanese Office Action dated Oct. 22, 2014, issued in Japanese patent application No. 2013-070789, with English translation. (11 pages).
Japanese Office Action dated Jan. 21, 2015, issued in Japanese patent application No. 2013-070789, with English translation. (8 pages).
Taiwanese Office Action dated Jun. 22, 2015, issued in Taiwanese patent application No. 103111890, with English translation. (9 pages).
Office Action dated Jan. 13, 2016, issued in Japanese Patent Application No. 2015-058520, with English translation. (9 pages).
Notice of Allowance dated May 25, 2017, issued in U.S. Appl. No. 14/780,695 (15 pages).

(56) References Cited

OTHER PUBLICATIONS

English translation of International Search Report dated May 27, 2014, issued in counterpart International Application No. PCT/JP2014/056433. (1 page).
Office Action dated Dec. 27, 2016, issued in counterpart Chinese Patent Application No. 201480032264.3, with English translation. (19 pages).
Notice of Allowance dated Jun. 15, 2017, issued in U.S. Appl. No. 14/780,695 (15 pages).
Notice of Allowance dated Jun. 19, 2017, issued in U.S. Appl. No. 14/780,673 (20 pages).
Office Action dated Jun. 23, 2017, issued in counterpart Korean application No. 10-2015-7034396, with English translation. (2 pages).

* cited by examiner

PRODUCTION METHOD FOR PHASE SHIFT FILM AND CIRCULAR POLARIZING PLATE INVOLVING BILATERALLY SYMMETRIC LOOPS WITH NON-SIMULTANEOUS REDUCTION OF CLIP PITCH

TECHNICAL FIELD

The present invention relates to a production method for a retardation film and a production method for a circularly polarizing plate.

BACKGROUND ART

A circularly polarizing plate has been used in an image display apparatus such as a liquid crystal display apparatus (LCD) or an organic electroluminescence display apparatus (OLED) for the purposes of improving its display characteristics and preventing reflection. The circularly polarizing plate is typically obtained by laminating a polarizer and a retardation film (typically a λ/4 plate) so that the absorption axis of the polarizer and the slow axis of the retardation film may form an angle of 45°. Heretofore, the retardation film has been typically produced by performing uniaxial stretching or biaxial stretching in a longitudinal direction and/or a lateral direction, and hence its slow axis is expressed in the lateral direction (widthwise direction) or longitudinal direction (lengthwise direction) of a raw film in many cases. As a result, in order to produce the circularly polarizing plate, it has been necessary to perform the following. The retardation film is cut so as to form an angle of 45° relative to its lateral direction or longitudinal direction, and the resultant pieces are bonded the polarizer one by one.

To solve such problem, there has been proposed a technology involving performing stretching in an oblique direction to express the slow axis of the retardation film in the oblique direction. However, the retardation film obtained by the stretching in the oblique direction has high biaxiality (e.g., has a large Nz coefficient). The use of such retardation film in an image display apparatus having a high reflectance involves a problem in that a change in reflectance or reflection hue of the apparatus increases depending on a viewing angle.

CITATION LIST

Patent Literature

[PTL 1]JP 4845619 B2

SUMMARY OF INVENTION

Technical Problem

The present invention has been made to solve the conventional problems, and an object of the present invention is to provide a method by which a retardation film suppressed in biaxiality, having a small Nz coefficient, and having a slow axis in an oblique direction can be produced with high production efficiency. Another object of the present invention is to provide a method by which a circularly polarizing plate excellent in optical characteristics can be produced with high production efficiency.

Solution to Problem

According to one embodiment of the present invention, there is provided a production method for a retardation film, including: holding left and right side edge portions of a film to be stretched with left and right variable pitch-type clips configured to have clip pitches changing in a longitudinal direction, respectively; preheating the film; reducing, under a state in which a position at which the clip pitch of the clips on one side out of the left and right clips starts to reduce and a position at which the clip pitch of the clips on another side starts to reduce are set to different positions in the longitudinal direction, the clip pitch of each of the clips to a predetermined pitch to subject the film to oblique stretching; and releasing the clips holding the film.

In one embodiment, the oblique stretching includes stretching in a lateral direction.

In one embodiment, a product of a clip pitch change ratio after the oblique stretching and a stretching ratio of the stretching in a lateral direction is from 1.3 to 3.0.

In one embodiment, the clip pitches of the left and right clips after the oblique stretching are 150 mm or more.

According to another embodiment of the present invention, there is provided a retardation film. The retardation film is obtained by the above-mentioned production method. The retardation film has an elongated shape, and has a slow axis in a direction forming a predetermined angle relative to a lengthwise direction.

In one embodiment, the retardation film has an Nz coefficient of 1.3 or less.

According to still another embodiment of the present invention, there is provided a production method for a circularly polarizing plate. The production method includes continuously bonding the retardation film and a polarizing plate having an elongated shape with lengthwise directions of the film and the plate aligned with each other while conveying the film and the plate.

Advantageous Effects of Invention

According to the embodiments of the present invention, the oblique stretching is performed by reducing the clip pitch of each of the left and right clips to a predetermined pitch under a state in which positions at which the clip pitches of the clips start to reduce are set to different positions in the longitudinal direction, whereby the retardation film suppressed in biaxiality, having a small Nz coefficient, and having a slow axis in an oblique direction can be obtained with high production efficiency. Further, according to the embodiments of the present invention, the retardation film thus obtained and the polarizing plate are laminated by the so-called roll-to-roll process, whereby the circularly polarizing plate excellent in optical characteristics can be obtained with high production efficiency.

DESCRIPTION OF EMBODIMENTS

Now, preferred embodiments of the present invention are described. However, the present invention is not limited to these embodiments.

A production method for a retardation film of the present invention includes: holding the left and right side edge portions of a film to be stretched with left and right variable pitch-type clips configured to have clip pitches changing in a longitudinal direction, respectively (step A: holding step); preheating the film (step B: preheating step); reducing, under a state in which a position at which the clip pitch of the clips on one side out of the left and right clips starts to reduce and a position at which the clip pitch of the clips on another side starts to reduce are set to different positions in the longitudinal direction, the clip pitch of each of the clips to a predetermined pitch to subject the film to oblique stretching (step C: stretching step); thermally treating the film as required under a state in which the clip pitches of the left and right clips are kept constant (step D: heat treatment step); and releasing the clips holding the film (step E: releasing step). Now, the respective steps are described in detail.

A. Holding Step

Figure 1:
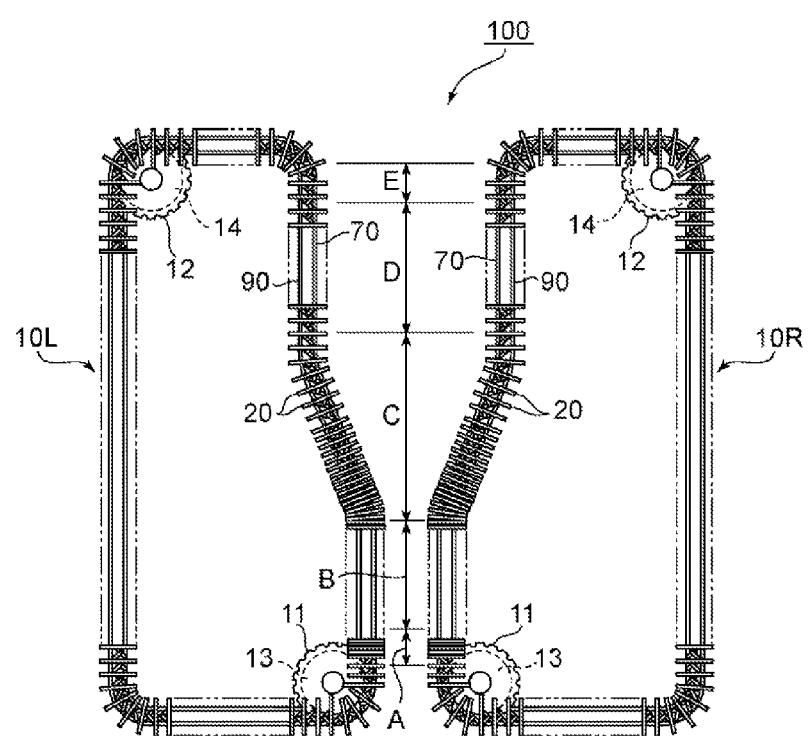
FIG. 1 is a schematic plan view for illustrating the entire construction of an example of a stretching apparatus that can be used in a production method of the present invention.
Figure 2:
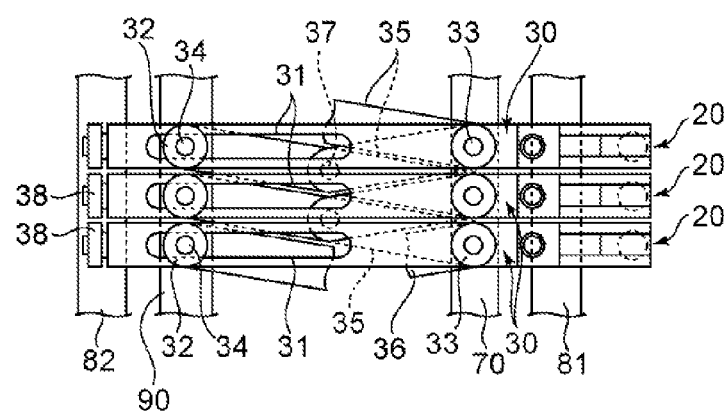
FIG. 2 is a main portion schematic plan view for illustrating a link mechanism via which a clip pitch is changed in the stretching apparatus of FIG. 1, the view being an illustration of a state in which the clip pitch is minimum.
Figure 3:
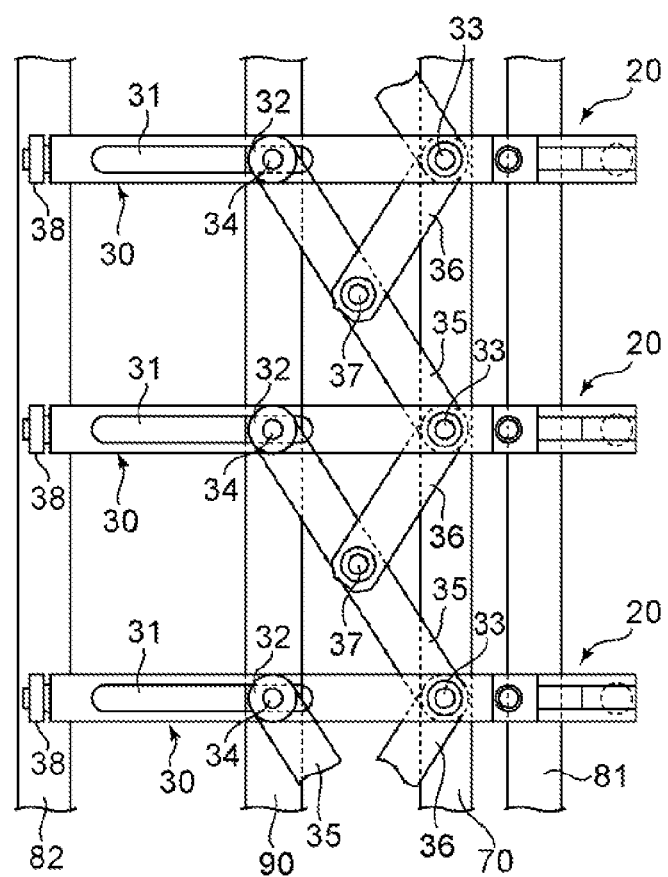
FIG. 3 is a main portion schematic plan view for illustrating the link mechanism via which the clip pitch is changed in the stretching apparatus of FIG. 1, the view being an illustration of a state in which the clip pitch is maximum.

First, a stretching apparatus that can be used in the production method of the present invention including this step is described with reference to FIG. 1 to FIG. 3. FIG. 1 is a schematic plan view for illustrating the entire construction of an example of the stretching apparatus that can be used in the production method of the present invention. FIG. 2 and FIG. 3 are each a main portion schematic plan view for illustrating a link mechanism via which a clip pitch is changed in the stretching apparatus of FIG. 1, FIG. 2 being an illustration of a state in which the clip pitch is minimum and FIG. 3 being an illustration of a state in which the clip pitch is maximum. In a planar view, a stretching apparatus 100 has, on both of its left and right sides, an endless loop 10L and an endless loop 10R each having many clips 20 for holding a film so that the loops may be bilaterally symmetric with each other. It should be noted that in this description, an endless loop on a left side when viewed from a film inlet side is referred to as "left endless loop 10L" and an endless loop on a right side is referred to as "right endless loop 10R". Each of the clips 20 of the left and right endless loops 10L and 10R is guided by a reference rail 70 to cyclically move in a loop manner. The clips 20 of the left endless loop 10L cyclically move in a counterclockwise direction and the clips 20 of the right endless loop 10R cyclically move in a clockwise direction. In the stretching apparatus, a holding zone A, a preheating zone B, a stretching zone C, a heat treatment zone D, and a releasing zone E are arranged in the stated order from a sheet inlet side toward a sheet outlet side. It should be noted that those zones mean zones in which the film to be stretched is substantially held, preheated, obliquely stretched, thermally treated, and released, respectively, and do not mean mechanically or structurally independent sections. In addition, attention should be paid to the fact that a ratio among the lengths of the respective zones is different from the actual length ratio.

In the holding zone A and the preheating zone B, the right and left endless loops 10R and 10L are configured to be substantially parallel to each other while being separated from each other by a distance corresponding to the initial width of the film to be stretched. In the stretching zone C, the right and left endless loops 10R and 10L are configured so that the distance by which the loops are separated from each other may gradually enlarge from the preheating zone B side toward the heat treatment zone D until the distance corresponds to the width of the film after its stretching. In the heat treatment zone D, the right and left endless loops 10R and 10L are configured to be substantially parallel to each other while being separated from each other by a distance corresponding to the width of the film after the stretching.

The clips (left clips) 20 of the left endless loop 10L and the clips (right clips) 20 of the right endless loop 10R can each independently cyclically move. For example, driving sprockets 11 and 12 of the left endless loop 10L are rotationally driven in the counterclockwise direction by electric motors 13 and 14, and the driving sprockets 11 and 12 of the right endless loop 10R are rotationally driven in the clockwise direction by the electric motors 13 and 14. As a result, a running force is imparted to a clip-carrying member 30 of each of drive rollers (not shown) engaging with the driving sprockets 11 and 12. Thus, the clips 20 of the left endless loop 10L cyclically move in the counterclockwise direction and the clips 20 of the right endless loop 10R cyclically move in the clockwise direction. The clips 20 of the left endless loop 10L and the clips 20 of the right endless loop 10R can each independently be cyclically moved by each independently driving a left electric motor and a right electric motor.

Further, the clips (left clips) 20 of the left endless loop 10L and the clips (right clips) 20 of the right endless loop 10R are each of a variable pitch type. That is, the clip pitches (clip-to-clip distances) of the left and right clips 20 and 20 in the longitudinal direction (MD) can each independently change in association with their movement. The variable pitch type can be realized by any appropriate construction. Now, description is given by taking a link mechanism (pantograph mechanism) as an example.

As illustrated in FIG. 2 and FIG. 3, the elongated rectangular clip-carrying members 30 are arranged in a lateral direction in a planar view by which the clips 20 are individually carried. Although not shown, the clip-carrying members 30 are each formed so as to be of a frame structure closed by an upper beam, a lower beam, a front wall (wall on the clip side), and a rear wall (wall on a side opposite to the clip), and having a strong section. The clip-carrying members 30 are each arranged so as to roll on running road surfaces 81 and 82 by virtue of running wheels 38 on both of its ends. It should be noted that in FIG. 2 and FIG. 3, a running wheel on the front wall side (running wheel rolling on the running road surface 81) is not shown. The running road surfaces 81 and 82 are parallel to the reference rail 70 over an entire region. On the rear sides (sides opposite to the clip) of the upper beam and lower beam of each of the clip-carrying members 30, a long hole 31 is formed along the lengthwise direction of the clip-carrying member and a slider 32 engages slidably in the lengthwise direction of the long hole 31. One first axis member 33 is vertically arranged near an end portion of each of the clip-carrying members 30 on the clip 20 side so as to penetrate its upper beam and lower beam. Meanwhile, one second axis member 34 is vertically arranged so as to penetrate the slider 32 of each of the clip-carrying members 30. One end of a main link member 35 is pivotally linked to the first axis member 33 of each of the clip-carrying members 30. The other end of the main link member 35 is pivotally linked to the second axis member 34 of the adjacent clip-carrying member 30. In addition to the main link member 35, one end of a sub-link member 36 is pivotally linked to the first axis member 33 of each of the clip-carrying members 30. The other end of the sub-link member 36 is pivotally linked to the central portion of the main link member 35 by a pivot 37. By virtue of the link mechanism based on the main link member 35 and the sub-link member 36, as the extent to which the slider 32 moves toward the rear side of the clip-carrying member 30 (side opposite to the clip) becomes larger as illustrated in FIG. 2, a pitch between the clip-carrying members 30 in the longitudinal direction (hereinafter simply referred to as "clip pitch") reduces, and as the extent to which the slider 32 moves toward the front side of the clip-carrying member 30 (clip side) becomes larger as illustrated in FIG. 3, the clip pitch increases. The positioning of the slider 32 is performed by a pitch-setting rail 90. As illustrated in FIG. 2 and FIG. 3, as the clip pitch becomes larger, the distance by which the reference rail 70 and the pitch-setting rail 90 are separated from each other reduces. It should be noted that additionally detailed description of the link mechanism is omitted because the mechanism is well-known in the art.

A retardation film having a slow axis in an oblique direction (e.g., a direction at 45° relative to the longitudinal direction) can be produced by obliquely stretching the film to be stretched with such stretching apparatus as described above. First, in the holding zone A (inlet of film intake by the stretching apparatus 100), both side edges of the film to be stretched are held with the clips 20 of the right and left endless loops 10R and 10L at constant clip pitches equal to each other, and the film is fed to the preheating zone B by the movement of the right and left endless loops 10R and 10L (substantially the movement of each of the clip-carrying members 30 guided by the reference rail 70).

B. Preheating Step

In the preheating zone (preheating step) B, as described above, the right and left endless loops 10R and 10L are configured to be substantially parallel to each other while being separated from each other by a distance corresponding to the initial width of the film to be stretched, and hence the film is basically heated without being laterally stretched or longitudinally stretched. However, a distance between the left and right clips (distance in a widthwise direction) may be slightly widened in order to avoid, for example, the following inconvenience: the film sags owing to the preheating to be brought into contact with a nozzle in an oven.

In the preheating step, the film is heated to a temperature T1 (° C.). The temperature T1 is preferably equal to or more than the glass transition temperature (Tg) of the film, more preferably equal to or more than Tg+2° C., still more preferably equal to or more than Tg+5° C. Meanwhile, the heating temperature T1 is preferably equal to or less than Tg+40° C., more preferably equal to or less than Tg+30° C. The temperature T1 is, for example, from 70° C. to 180° C., preferably from 120° C. to 180° C., though the temperature varies depending on the film to be used.

A time period required for the temperature of the film to be increased to the temperature T1 and a time period for which the temperature is held at the temperature T1 can be appropriately set depending on a constituent material for the film and a condition under which the film is produced (e.g., the speed at which the film is conveyed). The temperature increase time period and the holding time period can be controlled by adjusting, for example, the moving speeds of the clips 20, the length of the preheating zone, and the temperature of the preheating zone.

C. Stretching Step

In the stretching zone (stretching step) C, the film is subjected to oblique stretching by reducing, under a state in which a position at which the clip pitch of the clips on one side out of the left and right clips 20 starts to reduce and a position at which the clip pitch of the clips on another side starts to reduce are set to different positions in the longitudinal direction, the clip pitch of each of the clips to a predetermined pitch. For example, the oblique stretching can be performed while the distance between the left and right clips (distance in the widthwise direction) is widened like the illustrated example. Specific description is given below. It should be noted that in the following description, the stretching zone C is described while being divided into an inlet side stretching zone (first oblique stretching zone) C1 and an outlet side stretching zone (second oblique stretching zone) C2 for convenience. The lengths of the first oblique stretching zone C1 and the second oblique stretching zone C2, and a ratio between the respective lengths can be appropriately set depending on purposes.

Figure 4:
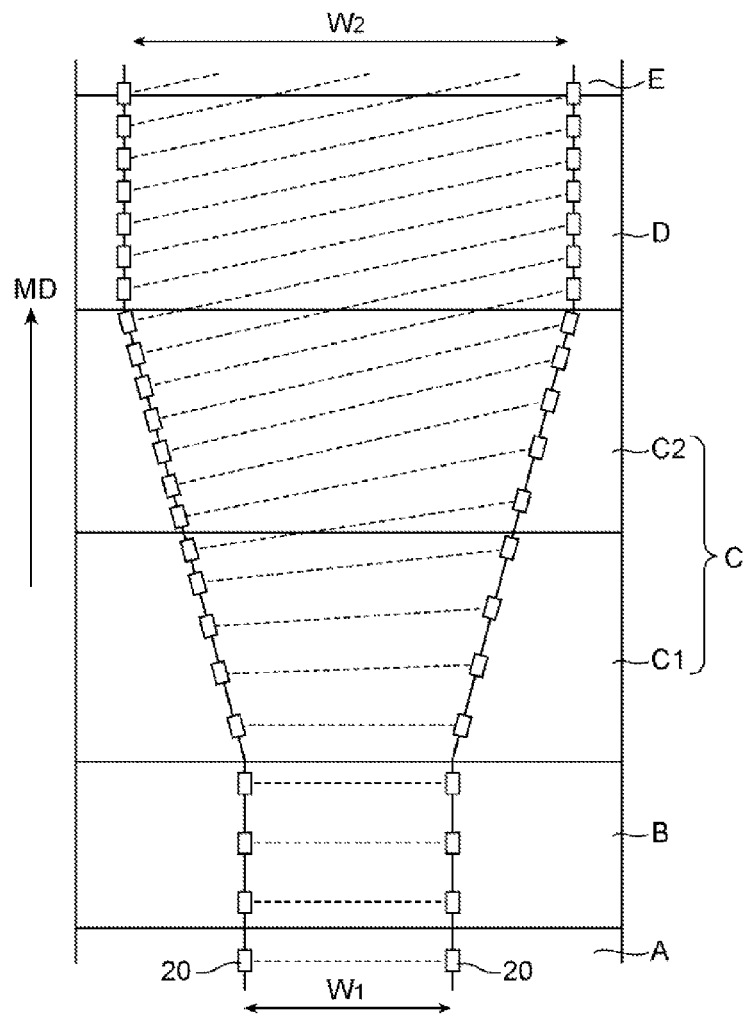
FIG. 4 is a schematic view for illustrating oblique stretching in a production method according to one embodiment of the present invention.

A typical embodiment is specifically described with reference to FIG. 4 and FIG. 5. First, in the preheating zone B, both left and right clip pitches are set to $P_1$. $P_1$ represent a clip pitch upon holding of the film. Next, the reduction of the clip pitch of the clips on one side (left side in the illustrated example) is started simultaneously with the entry of the film into the first oblique stretching zone C1. In the first oblique stretching zone C1, the clip pitch of the left clips is reduced to $P_2$. Meanwhile, the clip pitch of the right clips is maintained at $P_1$ in the first oblique stretching zone C1. Therefore, in the terminating portion of the first oblique stretching zone C1 (starting portion of the second oblique stretching zone C2), the left clips move at the clip pitch $P_2$ and the right clips move at the clip pitch $P_1$. Next, the reduction of the clip pitch of the right clips is started simultaneously with the entry of the film into the second oblique stretching zone C2. In the second oblique stretching zone C2, the clip pitch of the right clips is reduced to $P_2$. Meanwhile, the clip pitch of the left clips is maintained at $P_2$ in the second oblique stretching zone C2. Therefore, in the terminating portion of the second oblique stretching zone C2 (terminating portion of the stretching zone C), both the left clips and the right clips move at the clip pitch $P_2$. In the illustrated example, for simplicity, the position at which the clip pitch of the left clips starts to reduce is defined as the starting portion of the first oblique stretching zone C1 and the position at which the clip pitch of the right clips starts to reduce is defined as the starting portion of the second oblique stretching zone C2, but the positions can be set to any appropriate positions in the stretching zone. For example, the position at which the clip pitch of the left clips starts to reduce may be defined as the central portion of the first oblique stretching zone C1 and the position at which the clip pitch of the right clips starts to reduce may be defined as the central portion of the first oblique stretching zone C1 or the central portion of the second oblique stretching zone C2. It should be noted that a ratio between the clip pitches can generally correspond to a ratio between the moving speeds of the clips. Accordingly, the ratio between the clip pitches of the left and right clips can generally correspond to a ratio between the stretching ratios of the right side edge portion and left side edge portion of the film in the MD direction.

As described above, the clip pitches can be adjusted by positioning the sliders through the adjustment of the distance by which the pitch-setting rail and reference rail of the stretching apparatus are separated from each other.

In this embodiment, a ratio $P_2/P_1$ between the clip pitch $P_1$ and the clip pitch $P_2$ (hereinafter sometimes referred to as "clip pitch change ratio") is preferably from 0.50 to 0.90, more preferably from 0.55 to 0.80, still more preferably from 0.60 to 0.75. When the $P_2/P_1$ falls within such range, the biaxiality of a retardation film to be obtained can be suppressed and hence its Nz coefficient can be reduced. As a result, when the retardation film is applied to each of a circularly polarizing plate and an image display apparatus, its viewing angle characteristic (e.g., the dependency of each of its reflectance and reflection hue on a viewing angle) can be made excellent. When the clip pitch change ratio is less than 0.50, a corrugated galvanized iron-like wrinkle may occur in the retardation film to be obtained. When the clip pitch change ratio is more than 0.90, the Nz coefficient of the retardation film to be obtained may not become sufficiently small.

It is preferred that the clip pitch $P_2$ of the left and right clips after the oblique stretching be a predetermined value or more. In the case where the clip pitch $P_2$ is smaller than the predetermined value, even when the clip pitch $P_2$ is reduced at a clip pitch change ratio in the above-mentioned suitable range, a corrugated galvanized iron-like wrinkle may occur in the retardation film to be obtained. The predetermined value of the clip pitch $P_2$ may change depending on a stretching apparatus. For example, the clip pitch $P_2$ is preferably 130 mm or more, more preferably 150 mm or more. The practical upper limit of the clip pitch $P_2$ in the stretching apparatus is, for example, 210 mm.

The oblique stretching can be typically performed at a temperature T2. The temperature T2 is preferably from Tg−20° C. to Tg+30° C. where Tg represents the glass transition temperature of the resin film, more preferably from Tg−10° C. to Tg+20° C., particularly preferably about Tg+10° C. The temperature T2 is, for example, from 70° C. to 180° C., preferably from 80° C. to 170° C., though the temperature varies depending on the resin film to be used. A difference (T1−T2) between the temperature T1 and the temperature T2 is preferably ±2° C. or more, more preferably ±5° C. or more. In one embodiment, T1>T2 and hence the film heated to the temperature T1 in the preheating step can be cooled to the temperature T2.

The oblique stretching may include stretching in a lateral direction or may not include the stretching in a lateral direction. In other words, the width of the film after the oblique stretching may be larger than the initial width of the film or may be substantially equal to the initial width. Needless to say, the illustrated example is an illustration of an embodiment including the lateral stretching. When the oblique stretching includes the lateral stretching like the illustrated example, a stretching ratio in the lateral direction (ratio $W_2/W_1$ between an initial width $W_1$ of the film and a width $W_2$ of the film after the oblique stretching: hereinafter sometimes referred to as "TD stretching ratio" or "TD ratio") is preferably from 1.0 to 4.0, more preferably from 1.3 to 3.0. When the stretching ratio is excessively small, a corrugated galvanized iron-like wrinkle may occur in the retardation film to be obtained. When the stretching ratio is excessively large, the biaxiality of the retardation film to be obtained is raised, and hence in the case where the film is applied to a circularly polarizing plate or the like, its viewing angle characteristic may reduce.

The product of the clip pitch change ratio ($P_2/P_1$) and the TD stretching ratio is preferably from 1.2 to 3.0, more preferably from 1.4 to 2.5. When the product falls within such range, there is an advantage in that the Nz coefficient can be reduced without causing a corrugated galvanized iron-like wrinkle to occur in the retardation film to be obtained.

D. Heat Treatment Step

In the heat treatment zone (heat treatment step) D, the film is thermally treated under a state in which the clip pitches of the left and right clips 20 are kept constant. That is, under a state in which both the clip pitches of the left and right clips 20 are set to $P_2$, the film is heated while being conveyed. The heat treatment step can be performed as required.

The heat treatment can be typically performed at a temperature T3. The temperature T3 varies depending on the film to be stretched. In some cases, T2≥T3, and in other cases, T2<T3. In general, when the film is an amorphous material, T2≥T3, and when the film is a crystalline material, a crystallization treatment may be performed by setting the T2 and the T3 so that the T2 may be lower than the T3. When T2≥T3, a difference (T2−T3) between the temperatures T2 and T3 is preferably from 0° C. to 50° C. A heat treatment time is typically from 10 seconds to 10 minutes. The heat treatment time can be controlled by adjusting the length of the heat treatment zone and/or the speed at which the film is conveyed.

E. Releasing Step

Finally, the clips holding the film are released, whereby the retardation film is obtained. It should be noted that the width $W_2$ of the film after the oblique stretching corresponds to the width of the retardation film to be obtained (FIG. 4). When the oblique stretching does not include the lateral stretching, the width of the retardation film to be obtained is substantially equal to the initial width of the film.

F. Film to be Stretched and Retardation Film Obtained by Stretching

The film to be suitably used in the production method of the present invention (substantially the stretching method described in the section A to the section E) is, for example, any appropriate film that can be used as a retardation film. As a constituent material for the film, there are given, for example, a polycarbonate resin, a polyvinyl acetal resin, a cycloolefin-based resin, an acrylic resin, a cellulose ester-based resin, a cellulose-based resin, a polyester-based resin, a polyester carbonate-based resin, an olefin-based resin, and a polyurethane-based resin. Of those, a polycarbonate resin, a polyvinyl acetal resin, a cellulose ester-based resin, a polyester-based resin, or a polyester carbonate-based resin is preferred because a retardation film showing so-called reverse wavelength dispersion dependency can be obtained with any one of these resins. Those resins may be used alone or in combination depending on desired characteristics.

Any appropriate polycarbonate-based resin is used as the polycarbonate-based resin. A preferred example thereof is a polycarbonate resin containing a structural unit derived from a dihydroxy compound. Specific examples of the dihydroxy compound include 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3- tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene. The polycarbonate resin may contain a structural unit derived from the dihydroxy compound as well as a structural unit derived from a dihydroxy compound such as isosorbide, isomannide, isoidide, spiroglycol, dioxaneglycol, diethylene glycol, triethylene glycol, polyethylene glycol, or a bisphenol.

The polycarbonate resin as described above is disclosed in, for example, JP 2012-67300 A and JP 3325560 B2 in detail. The disclosures of the patent literatures are incorporated herein by reference.

The glass transition temperature of the polycarbonate resin is preferably 110° C. or more and 250° C. or less, more preferably 120° C. or more and 230° C. or less. When the glass transition temperature is excessively low, the heat resistance of the resin tends to deteriorate and hence the resin may cause a dimensional change after its forming into a film. When the glass transition temperature is excessively high, the forming stability of the resin at the time of its forming into a film may deteriorate. In addition, the transparency of the film may be impaired. It should be noted that the glass transition temperature is determined in conformity with JIS K 7121 (1987).

Any appropriate polyvinyl acetal resin may be used as the polyvinyl acetal resin. The polyvinyl acetal resin can be typically obtained by subjecting at least two kinds of aldehyde compounds and/or ketone compounds, and a polyvinyl alcohol-based resin to a condensation reaction. Specific examples of the polyvinyl acetal resin and a detailed production method therefor are disclosed in, for example, JP 2007-161994 A. The disclosure is incorporated herein by reference.

The refractive index characteristics of the retardation film obtained by stretching the film to be stretched preferably show a relationship of nx>ny. Further, the retardation film can preferably function as a λ/4 plate. An in-plane retardation Re (550) of the retardation film is preferably from 100 nm to 180 nm, more preferably from 135 nm to 155 nm. It should be noted that in this description, nx represents a refractive index in a direction in which an in-plane refractive index becomes maximum (i.e., a slow axis direction), ny represents a refractive index in a direction perpendicular to the slow axis in a plane (i.e., a fast axis direction), and nz represents a thickness direction refractive index. In addition, Re(λ) represents the in-plane retardation of the film measured with light having a wavelength of λ nm at 23° C. Therefore, the Re(550) represents the in-plane retardation of the film measured with light having a wavelength of 550 nm at 23° C. The Re(λ) is determined from the equation "Re(λ)=(nx−ny)×d" where d represents the thickness (nm) of the film.

The retardation film shows any appropriate refractive index ellipsoid as long as the ellipsoid has a relationship of nx>ny. The refractive index ellipsoid of the retardation film preferably shows a relationship of nx>ny≥nz.

As described above, according to the production method of the present invention, biaxiality is suppressed and hence a retardation film having a small Nz coefficient can be obtained. As a result, an image display apparatus excellent in dependency of each of its reflectance and reflection hue on a viewing angle can be obtained. The Nz coefficient of the retardation film is preferably from 1.00 to 1.30, more preferably from 1.00 to 1.25, still more preferably from 1.00 to 1.20, particularly preferably from 1.00 to 1.15. The Nz coefficient is determined by Nz=Rth(λ)/Re(λ), where Rth(λ) represents the thickness direction retardation of the film measured with light having a wavelength of λ nm at 23° C. Rth(λ) is determined from the equation "Rth(λ)=(nx−nz)×d".

The retardation film preferably shows so-called reverse wavelength dispersion dependency. Specifically, the in-plane retardation thereof satisfies a relationship of Re(450)<Re(550)<Re(650). Re(450)/Re(550) is preferably 0.8 or more and less than 1.0, more preferably from 0.8 to 0.95. Re(550)/Re(650) is preferably 0.8 or more and less than 1.0, more preferably from 0.8 to 0.97. An image display apparatus additionally excellent in dependency of each of its reflectance and reflection hue on a viewing angle can be obtained by a synergistic effect of the reverse wavelength dispersion dependency and the Nz.

The retardation film has an absolute value of its photoelastic coefficient of preferably from $2 \times 10^{-12}$ (m$^2$/N) to $100 \times 10^{-12}$ (m$^2$/N), more preferably from $2 \times 10^{-12}$ (m$^2$/N) to $50 \times 10^{-12}$ (m$^2$/N).

Figure 6:
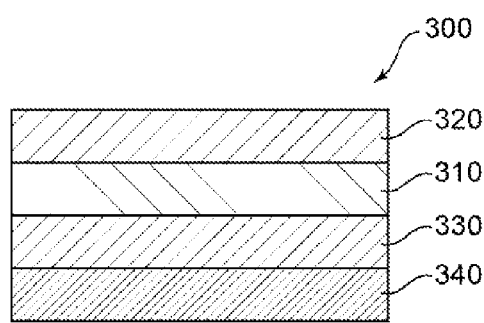
FIG. 6 is a schematic sectional view of a circularly polarizing plate using a retardation film obtained by the production method of the present invention.

G. Circularly Polarizing Plate and Production Method for Circularly Polarizing Plate Typically, the retardation film obtained by the production method of the present invention can be suitably used in a circularly polarizing plate. FIG. 6 is a schematic sectional view of an example of such circularly polarizing plate. A circularly polarizing plate 300 of the illustrated example includes a polarizer 310, a first protective film 320 arranged on one side of the polarizer 310, a second protective film 330 arranged on the other side of the polarizer 310, and a retardation film 340 arranged outside the second protective film 330. The retardation film 340 is the retardation film obtained by the production method of the present invention. The second protective film 330 may be omitted. In that case, the retardation film 340 can function as a protective film for the polarizer. An angle formed between the absorption axis of the polarizer 310 and the slow axis of the retardation film 340 is preferably from 30° to 60°, more preferably from 38° to 52°, still more preferably from 43° to 47°, particularly preferably about 45°. It should be noted that detailed description of the constructions of the polarizer and the protective film is omitted because the constructions are well-known in the art.

The circularly polarizing plate may further include any appropriate optical member or optical functional layer at any appropriate position depending on purposes. For example, the outer surface of the first protective film 320 may be subjected to a surface treatment such as a hard coat treatment, an antireflection treatment, an antisticking treatment, an antiglare treatment, or a light diffusion treatment. In addition, another retardation film showing any appropriate refractive index ellipsoid may be arranged on at least one side of the retardation film 340 depending on purposes. Further, an optical member such as a front substrate (e.g., a transparent protective substrate or a touch panel) may be arranged outside the first protective film 320.

The retardation film obtained by the production method of the present invention is extremely suitable for the production of a circularly polarizing plate. Details about the foregoing are as described below. The retardation film has an elongated shape and has a slow axis in an oblique direction (as described above, a direction at, for example, 45° relative to its lengthwise direction). In many cases, an elongated polarizer has an absorption axis in its lengthwise direction or widthwise direction, and hence the use of the retardation film obtained by the production method of the present invention enables the utilization of the so-called roll-to-roll process and enables the production of a circularly polarizing plate with extremely excellent production efficiency. Moreover, the retardation film obtained by the production method of the present invention is suppressed in biaxiality and has a small Nz coefficient, and hence can provide a circularly polarizing plate that can realize an image display apparatus excellent in dependency of each of its reflectance and reflection hue on a viewing angle. It should be noted that the roll-to-roll process refers to a method involving continuously bonding elongated films with their lengthwise directions aligned with each other while conveying the films with a roll.

Figure 7:
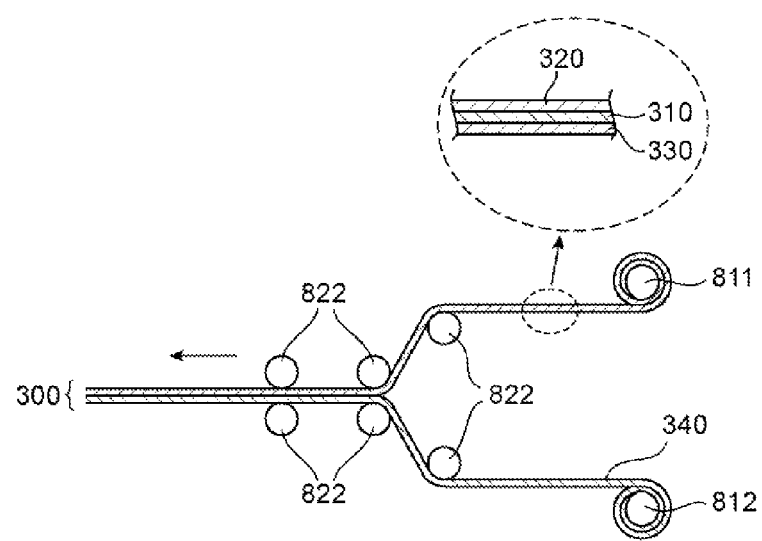
FIG. 7 is a schematic view for illustrating a production method for a circularly polarizing plate according to one embodiment of the present invention.

A production method for a circularly polarizing plate according to one embodiment of the present invention is simply described with reference to FIG. 7. In FIG. 7, reference symbols 811 and 812 represent rolls for taking up a polarizing plate and a retardation film, respectively, and reference symbol 822 represents a conveying roll. In the illustrated example, the polarizing plate (first protective film 320/polarizer 310/second protective film 330) and the retardation film 340 are fed in a direction indicated by an arrow, and are bonded under a state in which their respective lengthwise directions are aligned with each other. At that time, the bonding is performed so that the second protective film 330 of the polarizing plate and the retardation film 340 are adjacent to each other. Thus, such circularly polarizing plate 300 as illustrated in FIG. 6 can be obtained. Although not shown, a circularly polarizing plate in which the retardation film 340 functions as a protective film can also be produced by, for example, bonding the polarizing plate (first protective film 320/polarizer 310) and the retardation film 340 so that the polarizer 310 and the retardation film 340 are adjacent to each other.

EXAMPLES

Now, the present invention is specifically described by way of Examples. However, the present invention is not limited by Examples below. It should be noted that measurement and evaluation methods in Examples are as described below.

(1) Alignment Angle (Direction in which Slow Axis is Expressed)

A sample was produced by cutting a retardation film obtained in each of Examples and Comparative Example into a square shape measuring 50 mm wide by 50 mm long so that one side of the square was parallel to the widthwise direction of the film. An alignment angle θ of the sample at a wavelength of 550 nm and 23° C. was measured with a Mueller matrix polarimeter (manufactured by Axometrics, product name: "Axoscan"). It should be noted that the alignment angle θ was measured under a state in which the sample was placed so as to be parallel to a measuring stage.

(2) In-Plane Retardation Re

Measurement was performed at a wavelength of 550 nm and 23° C. with a product available under the product name "Axoscan" from Axometrics in the same manner as in the section (1).

(3) Thickness Direction Retardation Rth

Measurement was performed at a wavelength of 550 nm and 23° C. with a product available under the product name "Axoscan" from Axometrics in the same manner as in the section (1).

(4) Nz Coefficient

An Nz coefficient was calculated from the equation "Nz=Rth/Re".

(5) Viewing Angle Characteristic

An organic EL panel was removed from an organic EL display (manufactured by LG, product name: "15EL9500") and a polarizing plate bonded to the organic EL panel was peeled. A circularly polarizing plate was produced by bonding the retardation film obtained in each of Examples and Comparative Example, and the polarizing plate with a pressure-sensitive adhesive so that an angle formed between the alignment angle of the film and the absorption axis of the plate became 45°. The circularly polarizing plate was bonded to the organic EL panel from which the polarizing plate had been peeled with a pressure-sensitive adhesive. The organic EL panel having bonded thereto the circularly polarizing plate was visually observed from various directions, and its reflectance and reflection hue were observed. Evaluation criteria are as described below.

○ . . . Even when the display is viewed from the various directions, the reflection hue and the reflectance are generally constant.

Δ . . . As the angle at which the display is viewed deepens, the reflection hue and the reflectance are found to change.

× . . . The reflection hue and the reflectance are found to change depending on the angle at which the display is viewed.

(6) Wrinkle

The state of the retardation film obtained in each of Examples and Comparative Example was visually observed. Evaluation criteria are as described below.

○ . . . None of a wrinkle and waviness is observed over the entirety of the film.

Δ . . . A corrugated galvanized iron-like wrinkle is present in an end portion in the widthwise direction of the film and hence the portion waves, but the central portion of the film has no waviness.

× . . . A corrugated galvanized iron-like wrinkle is present in the film and hence the film waves.

(7) Thickness

Measurement was performed with a microgauge-type thickness meter (manufactured by Mitutoyo Corporation).

Example 1

(Production of Polycarbonate Resin Film)

Polymerization was performed with a batch polymerization apparatus formed of two vertical reactors each including a stirring blade and a reflux condenser controlled to 100° C. 9,9-[4-(2-Hydroxyethoxy)phenyl]fluorene (BHEPF), isosorbide (ISB), diethylene glycol (DEG), diphenyl carbonate (DPC), and magnesium acetate tetrahydrate were loaded at a molar ratio "BHEPF/ISB/DEG/DPC/magnesium acetate" of $0.348/0.490/0.162/1.005/1.00 \times 10^{-5}$. After a first reactor had been sufficiently purged with nitrogen (oxygen concentration: 0.0005 vol % to 0.001 vol %), the inside of the reactor was warmed with a heating medium, and when a temperature in the reactor reached 100° C., stirring was started. 40 Minutes after the start of the temperature increase, the internal temperature was caused to reach 220° C. and the reactor was controlled so as to hold the temperature, and at the same time, a pressure reduction was started. 90 Minutes after the temperature had reached 220° C., a pressure in the reactor was set to 13.3 kPa. A phenol vapor produced as a by-product of the polymerization reaction was introduced into the reflux condenser at 100° C., a monomer component present in a slight amount in the phenol vapor was returned to the reactor, and a phenol vapor that did not condense was introduced into a condenser at 45° C. and recovered.

Nitrogen was introduced into the first reactor to return the pressure to the atmospheric pressure once. After that, an oligomerized reaction liquid in the first reactor was transferred to a second reactor. Next, the increase of a temperature in the second reactor and the reduction of a pressure therein were started, and the internal temperature and the pressure were set to 240° C. and 0.2 kPa, respectively in 50 minutes. After that, the polymerization was caused to proceed until predetermined stirring power was achieved. When the predetermined power was achieved, nitrogen was introduced into the reactor to return the pressure to the atmospheric pressure, and the reaction liquid was taken out in the form of a strand and pelletized with a rotary cutter. Thus, a polycarbonate resin A having a copolymerization composition "BHEPF/ISB/DEG" of 34.8/49.0/16.2 [mol %] was obtained. The polycarbonate resin had a reduced viscosity of 0.430 dL/g and a glass transition temperature of 128° C.

The resultant polycarbonate resin was dried in a vacuum at 80° C. for 5 hours, and was then formed into a polycarbonate resin film having a thickness of 150 μm with a film-producing apparatus including a uniaxial extruder (manufactured by Isuzu Kakoki, screw diameter: 25 mm, cylinder preset temperature: 220° C.), a T-die (width: 275 mm, preset temperature: 220° C.), a chill roll (preset temperature: 120° C. to 130° C.), and a take-up unit.

(Oblique Stretching)

Figure 5:
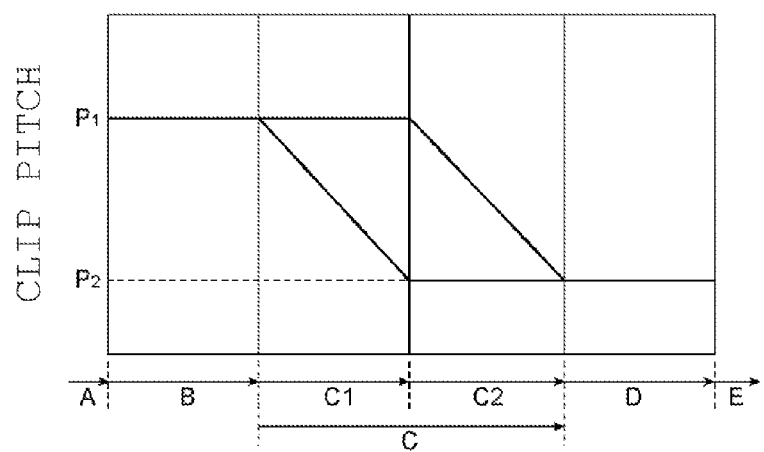
FIG. 5 is a graph for showing a relationship between each zone of the stretching apparatus and the clip pitch at the time of the oblique stretching illustrated in FIG. 4.

The polycarbonate resin film obtained as described above was subjected to a preheating treatment, oblique stretching, and a heat treatment with such apparatus as illustrated in FIG. 1 to FIG. 4 according to such clip pitch profile as illustrated in FIG. 5 to provide a retardation film. A specific procedure is as described below. The polycarbonate resin film (thickness: 150 μm, width: 275 mm) was preheated to 145° C. in the preheating zone of the stretching apparatus. In the preheating zone, the clip pitches of the left and right clips were 215 mm. Next, the reduction of the clip pitch of the left clips was started simultaneously with the entry of the film into the first oblique stretching zone C1, and in the first oblique stretching zone C1, the clip pitch was reduced from 215 mm to 150.5 mm. In the first oblique stretching zone C1, the clip pitch of the right clips was maintained at the clip pitch in the preheating zone, i.e., 215 mm. Next, the reduction of the clip pitch of the right clips was started simultaneously with the entry of the film into the second oblique stretching zone C2, and in the second oblique stretching zone C2, the clip pitch was reduced from 215 mm to 150.5 mm. Meanwhile, the clip pitch of the left clips was maintained at 150.5 mm in the second oblique stretching zone C2. The clip pitch change ratio before and after the oblique stretching was 0.70. It should be noted that the oblique stretching was performed at 138° C. The oblique stretching includes stretching in a lateral direction, and the stretching ratio in the lateral direction was 2.15 times. As described above, a retardation film was obtained. The resultant retardation film was subjected to the evaluations (1) to (7). The results are shown in Table 1.

Example 2

A retardation film was obtained in the same manner as in Example 1 except that: the thickness of the polycarbonate resin film before the stretching was set to 175 μm; and the stretching ratio in the lateral direction was set to 2.5 times. The resultant retardation film was subjected to the same evaluations as those of Example 1. The results are shown in Table 1.

Example 3

A retardation film was obtained in the same manner as in Example 1 except that: the clip pitches of the left and right clips in the preheating zone (that is, before the oblique stretching) were set to 250 mm; and the clip pitches of the left and right clips after the oblique stretching were set to 175 mm. The clip pitch change ratio before and after the oblique stretching was 0.70. The resultant retardation film was subjected to the same evaluations as those of Example 1. The results are shown in Table 1.

Example 4

A retardation film was obtained in the same manner as in Example 1 except that: the thickness of the polycarbonate resin film before the stretching was set to 185 μm; the clip pitches of the left and right clips in the preheating zone (that is, before the oblique stretching) were set to 250 mm; the clip pitches of the left and right clips after the oblique stretching were set to 150 mm; and the stretching ratio in the lateral direction was set to 3.0 times. The clip pitch change ratio before and after the oblique stretching was 0.60. The resultant retardation film was subjected to the same evaluations as those of Example 1. The results are shown in Table 1.

Example 5

A retardation film was obtained in the same manner as in Example 1 except that: a cycloolefin-based resin film ("ZEONOR ZF-14 Film" manufactured by Zeon Corporation, thickness: 100 μm, width: 275 mm) was used instead of the polycarbonate-based resin film; the film was preheated to 150° C. in the preheating zone; and the oblique stretching (including the lateral stretching) was performed at 150° C. The resultant retardation film was subjected to the same evaluations as those of Example 1. The results are shown in Table 1.

Example 6

(Production of Polyvinyl Acetal-based Resin Film)

880 Grams of a polyvinyl alcohol-based resin [manufactured by The Nippon Synthetic Chemical Industry Co., Ltd., trade name: "NH-18" (polymerization degree=1,800, saponification degree=99.0%)] was dried at 105° C. for 2 hours, and was then dissolved in 16.72 kg of dimethyl sulfoxide (DMSO). 298 Grams of 2-methoxy-1-naphthaldehyde and 80 g of p-toluenesulfonic acid monohydrate were added to the solution, and the mixture was stirred at 40° C. for 1 hour. 318 Grams of benzaldehyde was added to the reaction solution and the mixture was stirred at 40° C. for 1 hour. After that, 457 g of dimethyl acetal was further added to the resultant and the mixture was stirred at 40° C. for 3 hours. After that, 213 g of triethylamine was added to the resultant to terminate a reaction. The resultant crude product was reprecipitated with methanol. A filtered polymer was dissolved in tetrahydrofuran, followed by reprecipitation with methanol again. The precipitate was filtered and dried to provide 1.19 kg of a white polymer.

$^1$H-NMR measurement showed that the resultant polymer had a repeating unit represented by the following formula (XI) and a ratio (molar ratio) "l:m:n:o" was 10:25:52:11. In addition, the glass transition temperature of the polymer was measured to be 130° C.

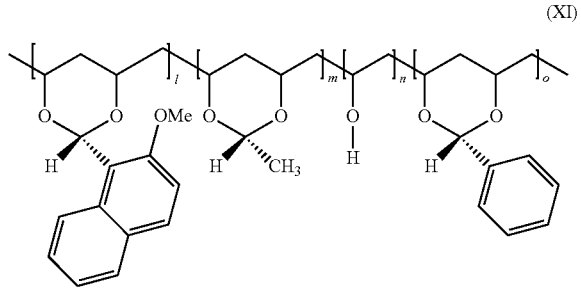

(XI)

The resultant polymer was dissolved in methyl ethyl ketone (MEK). The resultant solution was applied onto a polyethylene terephthalate film (thickness: 70 μm) with a die coater and dried with an air-circulating drying oven. After that, the dried product was peeled from the polyethylene terephthalate film to provide a film having a thickness of 190 μm and a width of 275 mm.

A retardation film was obtained in the same manner as in Example 1 except that: the polyvinyl acetal-based resin film was used; the film was preheated at 145° C. in the preheating zone; and the oblique stretching (including the lateral stretching) was performed at 140° C. The resultant retardation film was subjected to the same evaluations as those of Example 1. The results are shown in Table 1.

Example 7

A retardation film was obtained in the same manner as in Example 1 except that: the thickness of the polycarbonate resin film before the stretching was set to 185 μm; and the stretching ratio in the lateral direction was set to 3.0 times. The resultant retardation film was subjected to the same evaluations as those of Example 1. The results are shown in Table 1.

Example 8

A retardation film was obtained in the same manner as in Example 1 except that: the thickness of the polycarbonate resin film before the stretching was set to 190 μm; and the stretching ratio in the lateral direction was set to 1.8 times. The resultant retardation film was subjected to the same evaluations as those of Example 1. Although wrinkles occurred in both end portions of the resultant film, the central portion thereof was measurable and practically usable. The results are shown in Table 1.

Example 9

A retardation film was obtained in the same manner as in Example 1 except that: the thickness of the polycarbonate resin film before the stretching was set to 150 μm; and the clip pitches of the left and right clips in the preheating zone (that is, before the oblique stretching) were set to 175 mm and the clip pitches of the left and right clips after the oblique stretching were set to 122.5 mm. The clip pitch change ratio before and after the oblique stretching was 0.70. The resultant retardation film was subjected to the same evaluations as those of Example 1. Although wrinkles occurred in both end portions of the resultant film, the central portion thereof was measurable and practically usable. The results are shown in Table 1.

Comparative Example 1

A retardation film was produced by subjecting a polycarbonate resin film having a width of 765 mm and a thickness before stretching of 230 μm to oblique stretching while increasing both the clip pitches of the left and right clips. A specific procedure is as described below. In the first oblique stretching zone C1, the clip pitch of the right clips was increased from 125 mm to 200 mm. A clip pitch change ratio was 1.60. In the first oblique stretching zone C1, the clip pitch of the left clips was maintained at the clip pitch in the preheating zone, i.e., 125 mm. Next, in the second oblique stretching zone C2, the clip pitch of the left clips was increased from 125 mm to 200 mm. A clip pitch change ratio was 1.60. In the second oblique stretching zone C2, the clip pitch of the right clips was maintained at 200 mm. The oblique stretching included stretching in a lateral direction, and the stretching ratio in the lateral direction was 1.8 times. As described above, a retardation film was obtained. The resultant retardation film was subjected to the same evaluations as those of Example 1. The results are shown in Table 1.

TABLE 1

| | Stretching method | Clip pitch before oblique stretching | Clip pitch change ratio | Clip pitch after oblique stretching | TD ratio | Product | Alignment angle (median value) | Re (550) (nm) | Nz coefficient | Wrinkle | Viewing angle characteristic | Thickness (nm) |
|---|---|---|---|---|---|---|---|---|---|---|---|---|
| Example 1 | Right shrinkage, left shrinkage | 215 | 0.70 | 150.5 | 2.15 | 1.51 | 45° | 146 | 1.02 | ○ | ○ | 100 |
| Example 2 | Right shrinkage, left shrinkage | 215 | 0.70 | 150.5 | 2.50 | 1.75 | 41° | 140 | 1.10 | ○ | ○ | 101 |
| Example 3 | Right shrinkage, left shrinkage | 250 | 0.70 | 175 | 2.15 | 1.51 | 46° | 147 | 1.01 | ○ | ○ | 100 |
| Example 4 | Right shrinkage, left shrinkage | 250 | 0.60 | 150 | 3.00 | 1.80 | 44° | 143 | 1.05 | ○ | ○ | 103 |
| Example 5 | Right shrinkage, left shrinkage | 215 | 0.70 | 150.5 | 2.15 | 1.51 | 45° | 145 | 1.04 | ○ | ○ | 67 |
| Example 6 | Right shrinkage, left shrinkage | 215 | 0.70 | 150.5 | 2.15 | 1.51 | 45° | 140 | 1.01 | ○ | ○ | 126 |
| Example 7 | Right shrinkage, left shrinkage | 215 | 0.70 | 150.5 | 3.00 | 2.10 | 36° | 140 | 1.15 | ○ | ○ | 90 |
| Example 8 | Right shrinkage, left shrinkage | 215 | 0.70 | 150.5 | 1.80 | 1.26 | 51° | 135 | 1.11 | Δ | ○ | 150 |

TABLE 1-continued

|  | Stretching method | Clip pitch before oblique stretching | Clip pitch change ratio | Clip pitch after oblique stretching | TD ratio | Product | Alignment angle (median value) | Re (550) (nm) | Nz coefficient | Wrinkle | Viewing angle characteristic | Thickness (nm) |
|---|---|---|---|---|---|---|---|---|---|---|---|---|
| Example 9 | Right shrinkage, left shrinkage | 175 | 0.70 | 122.5 | 2.15 | 1.51 | 45° | 144 | 1.02 | Δ | ○ | 100 |
| Comparative Example 1 | Right stretching, left stretching | 125 | 1.60 | 200 | 1.80 | 2.88 | 48° | 140 | 1.33 | ○ | x | 75 |

<Evaluation>

As is apparent from Table 1, the retardation film obtained by each of Examples of the present invention was suppressed in biaxiality and had a small Nz coefficient, and when the film was applied to an image display apparatus, the apparatus showed an excellent viewing angle characteristic. On the other hand, the retardation film of Comparative Example had large biaxiality and hence had a large Nz coefficient, and when the film was applied to an image display apparatus, its viewing angle characteristic was insufficient. That is, it is found that such excellent effect is obtained by performing oblique stretching while reducing the clip pitches of the left and right clips.

INDUSTRIAL APPLICABILITY

The retardation film obtained by the production method of the present invention is suitably used in a circularly polarizing plate, and as a result, is suitably used in an image display apparatus such as a liquid crystal display apparatus (LCD) or an organic electroluminescence display apparatus (OLED).

REFERENCE SIGNS LIST 10L endless loop
10R endless loop
20 clip
30 clip-carrying member
70 reference rail
90 pitch-setting rail
100 stretching apparatus
300 circularly polarizing plate
310 polarizer
320 first protective film
330 second protective film
340 retardation film

The invention claimed is:

1. A production method for a retardation film, comprising:
holding left and right side edge portions of a film to be stretched with left and right variable pitch-type clips configured to have clip pitches changing in a longitudinal direction, respectively;
preheating the film;
reducing, under a state in which a position at which the clip pitch of the clips on one side out of the left and right clips starts to reduce and a position at which the clip pitch of the clips on another side starts to reduce are set to different positions in the longitudinal direction, the clip pitch of each of the clips to a predetermined pitch to subject the film to oblique stretching;
while reducing the clip pitch of each of the clips, widening a distance between the left and right clips; and
releasing the clips holding the film,
wherein the position at which the clip pitch of the clips on the one side starts to reduce is before the position at which the clip pitch of the clips on the another side starts to reduce,
prior to reducing the clip pitch on the one side, the clip pitch on the one side is substantially the same as the clip pitch on the another side,
the left and right clips cyclically move along a left endless loop and a right endless loop, respectively, and
the left endless loop and the right endless loop are bilaterally symmetric with each other in a planar view.

2. The production method for a retardation film according to claim 1, wherein a product of a clip pitch change ratio after the oblique stretching and a stretching ratio of the widening distance between the left and right clips is from 1.3 to 3.0.

3. The production method for a retardation film according to claim 1, wherein the clip pitches of the left and right clips after the oblique stretching are 150 mm or more.

4. A production method for a circularly polarizing plate, comprising:
obtaining a retardation film having an elongated shape by the production method according to claim 1, and
continuously bonding the obtained retardation film having an elongated shape and a polarizing plate having an elongated shape with lengthwise directions of the film and the plate aligned with each other while conveying the film and the plate.

* * * * *